United States Patent [19]

Ohta et al.

[11] Patent Number: 5,729,775
[45] Date of Patent: Mar. 17, 1998

[54] CAMERA HAVING FILM COUNTER

[75] Inventors: Hidefumi Ohta, Kawasaki; Kiyosada Machida, Urawa; Hiroshi Wakabayashi, Yokohama, all of Japan

[73] Assignee: Nikon Corporation, Tokyo, Japan

[21] Appl. No.: 723,758

[22] Filed: Sep. 30, 1996

[30] Foreign Application Priority Data

Sep. 29, 1995 [JP] Japan .................... 7-253910

[51] Int. Cl.⁶ ............................ G03B 17/36
[52] U.S. Cl. ............................ 396/284; 396/277
[58] Field of Search ................ 396/277, 279, 396/280, 281, 284, 406, 408

[56] References Cited

U.S. PATENT DOCUMENTS

| | | | |
|---|---|---|---|
| 4,312,581 | 1/1982 | Miyagawa et al. | 354/106 |
| 4,941,005 | 7/1990 | Kameyama et al. | 354/195.1 |
| 5,019,846 | 5/1991 | Goto et al. | 354/217 |
| 5,070,357 | 12/1991 | Kazami et al. | 354/468 |
| 5,081,483 | 1/1992 | Ishimura et al. | 354/412 |
| 5,293,191 | 3/1994 | Umetsu | 354/173.1 |
| 5,390,130 | 2/1995 | Watanabe et al. | 364/483 |

*Primary Examiner*—Safet Metjahic
*Assistant Examiner*—John Chizmar
*Attorney, Agent, or Firm*—Oliff & Berridge PLC

[57] ABSTRACT

A camera having a film counter according to the present invention includes a display device which displays information related to frames of a film; a detector which detects that a battery has been replaced while the camera is loaded with the film; a volatile memory which stores information related to a number of remaining unexposed frames of the film; and a controller which causes the display device to display the number of remaining unexposed frames according to the information stored in the volatile memory until the battery is replaced, and switches the display device to display a frame number in a forward count display, in which a frame number increases for each exposure, in response to a signal generated by the detector upon replacement of the battery.

7 Claims, 5 Drawing Sheets

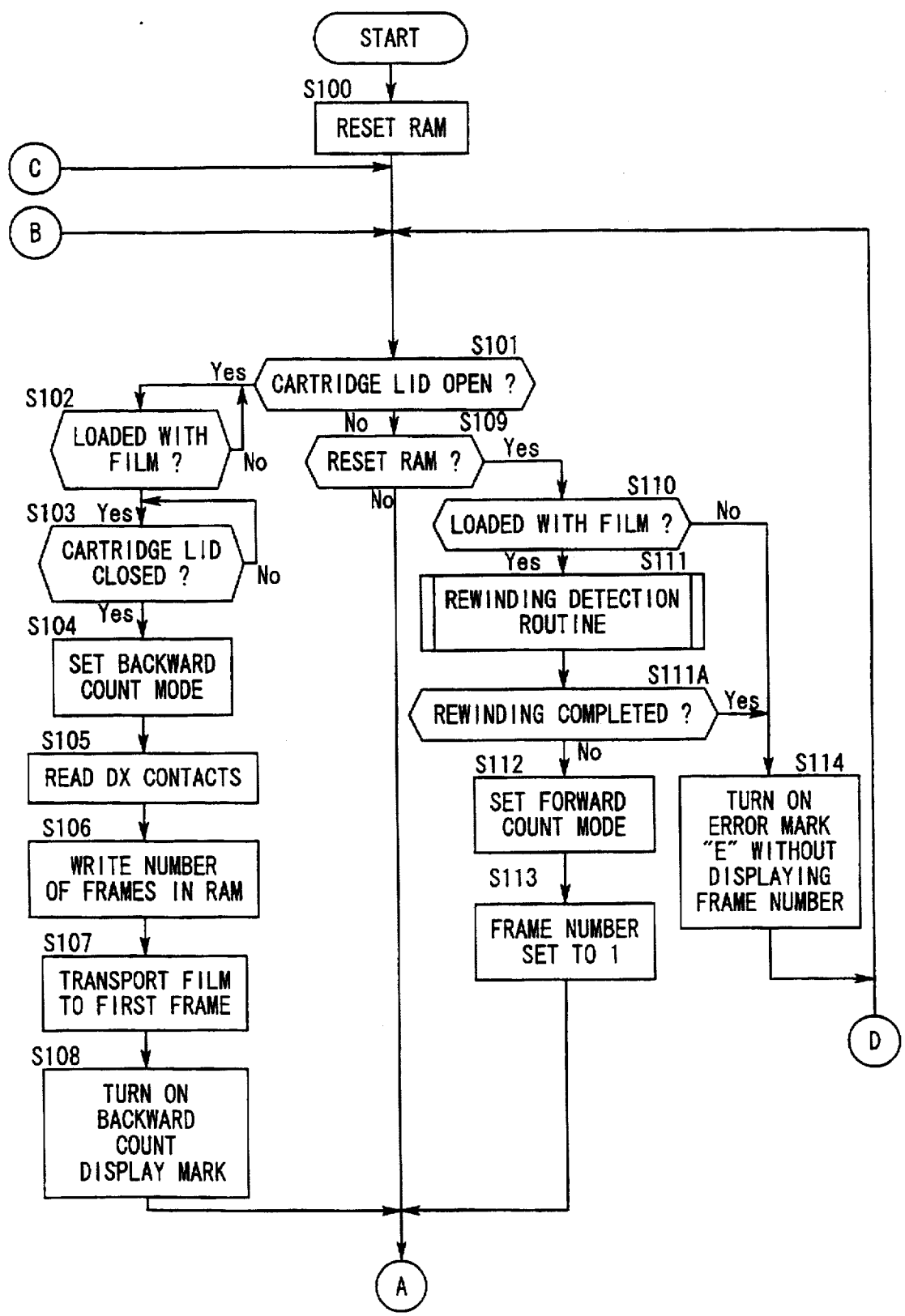

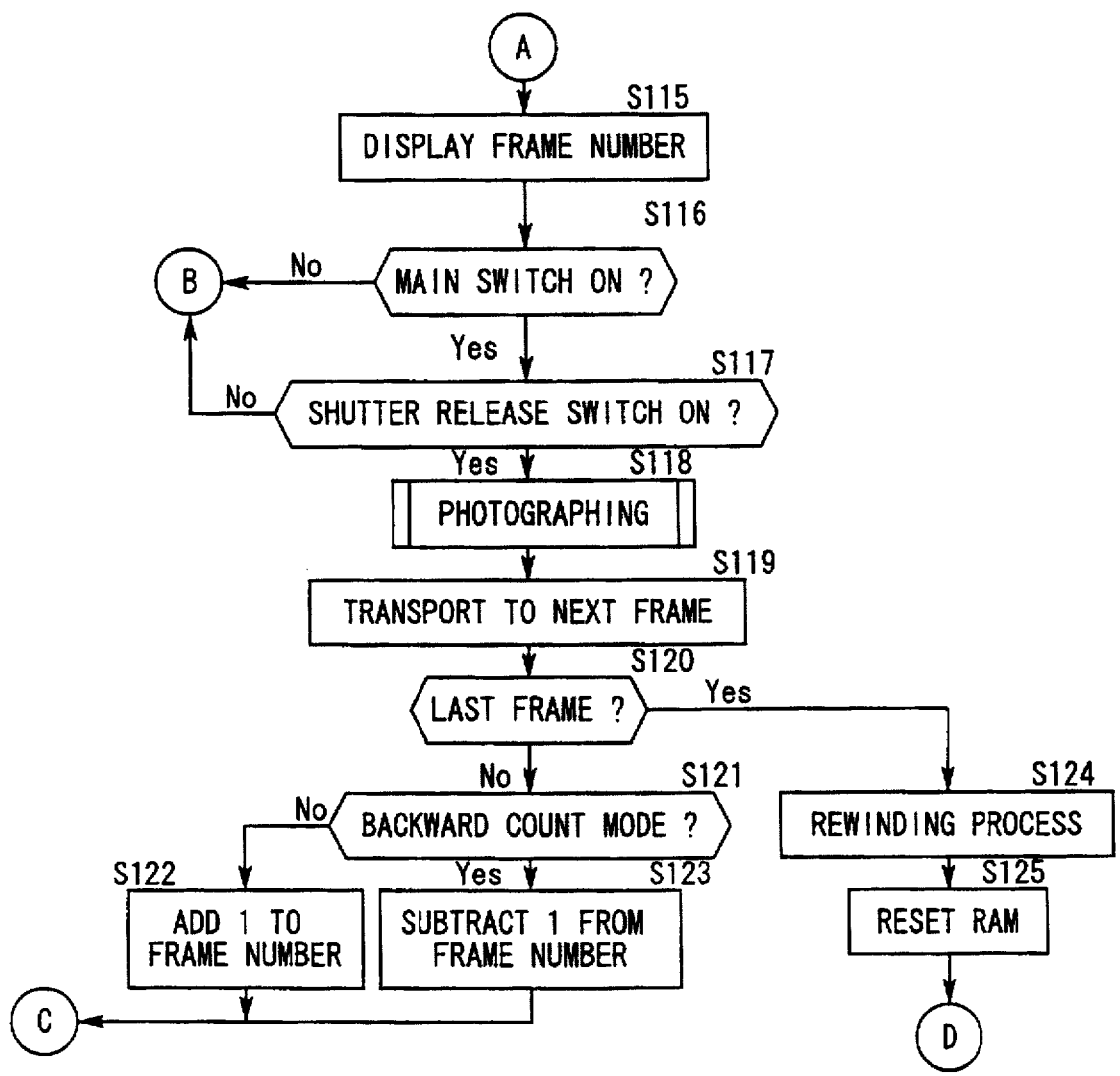

5,729,775

CAMERA HAVING FILM COUNTER

BACKGROUND OF THE INVENTION

1. Field of the Invention

The present invention relates to a camera having a film counter, wherein the number of remaining unexposed frames of a film is displayed.

2. Description of Related Art

There is known a camera that is adapted to read information related to the number of frames of a film which are available for photographing, subtract one from the input number of the frames for each exposure to obtain the number of remaining unexposed frames, and display the thus obtained number. The information related to the number of frames of a film which are to be exposed is included in coded information provided on a film cartridge as DX contacts.

Where a nonvolatile memory, such as $E^2PROM$, is not installed in the camera, the stored number of remaining unexposed frames disappears from the memory when a battery is replaced by a new one. If the same control flow is kept performed for displaying the number of remaining unexposed frames even after the battery is replaced, therefore, a number that is different from the actual number of remaining frames may be displayed, thereby giving an erroneous assumption to a camera user. Meanwhile, the use of the nonvolatile memory, such as $E^2PROM$, as a memory makes the resulting camera more expensive than one using a volatile memory.

SUMMARY OF THE INVENTION

It is therefore an object of the present invention to provide a camera that is available at a low cost, and prevents a user from misunderstanding the number of remaining unexposed frames of a film after replacement of a battery.

To accomplish the above object, there is provided a camera having a film counter comprising: a display device which displays information related to frames of a film; a detector which detects that a battery has been replaced while the camera is loaded with the film; a volatile memory which stores information related to a number of remaining unexposed frames of the film; and a controller which causes the display device to display the number of remaining unexposed frames according to the information stored in the volatile memory until the battery is replaced, and switches the display device to display a frame number in a forward count display, in which a frame number increases for each exposure, in response to a signal generated by the detector upon replacement of the battery.

BRIEF DESCRIPTION OF THE DRAWINGS

This invention will be described in greater detail with reference to a certain preferred embodiment thereof and the accompanying drawings, wherein:

FIG. 2A is a flow chart showing a control routine executed in the camera of the embodiment of FIG. 1;

FIG. 2B is a flow chart following the flow chart of FIG. 2A.

DETAILED DESCRIPTION OF THE PREFERRED EMBODIMENT

Figure 1:
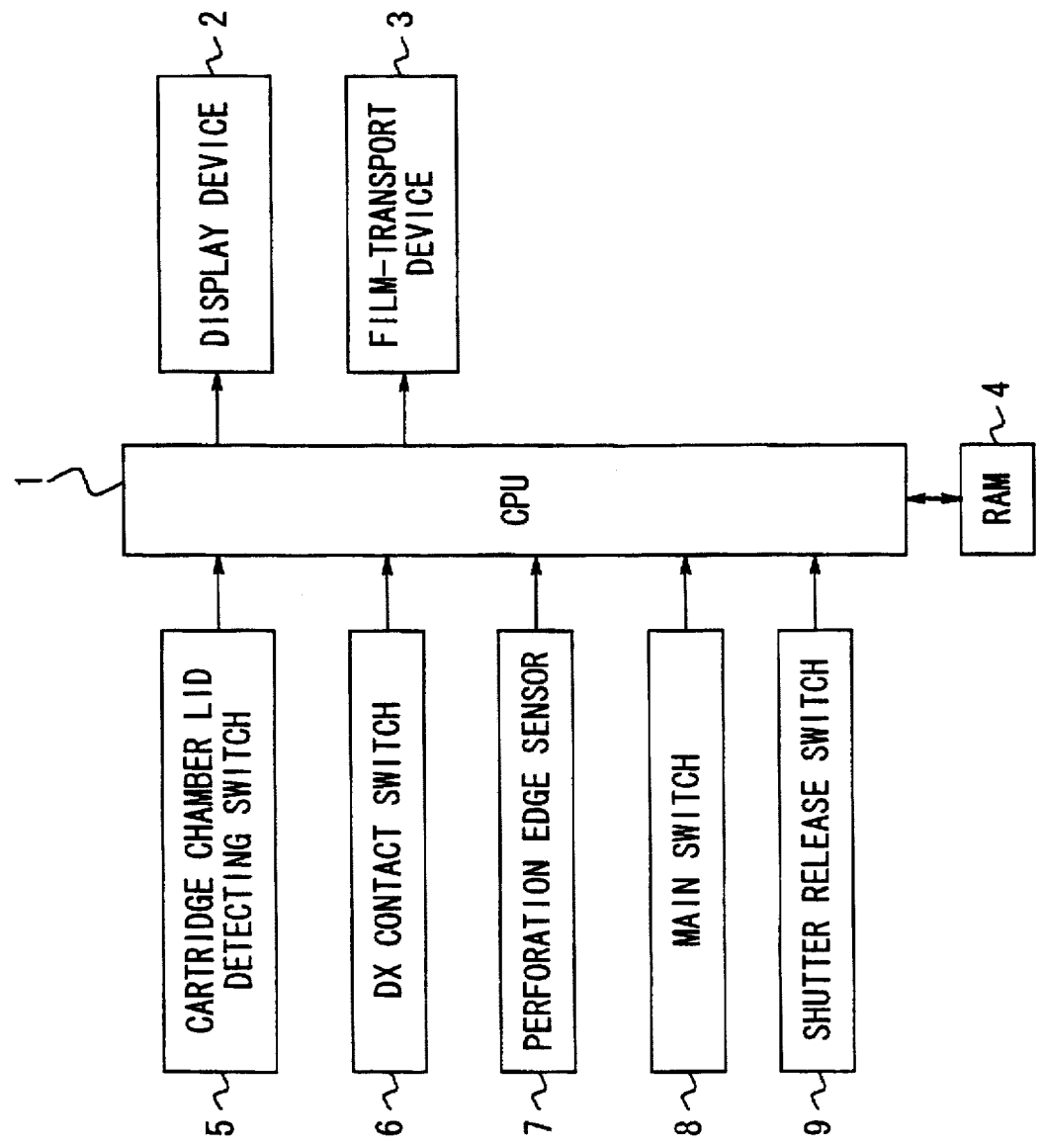
FIG. 1 is a block diagram showing one embodiment of a camera having a film counter of the present invention.

FIG. 1 is a block diagram showing one embodiment of the camera of the present invention. The camera of the present embodiment includes a CPU 1, a display device 2 for displaying various kinds of information including the number of remaining unexposed frames of a film, a film-transport device 3 for transporting the film, and RAM4 in the form of a volatile memory that stores the number of remaining unexposed frames of the film and other information. The camera further includes a cartridge chamber lid detecting switch 5 for detecting open and closed states of a lid of a cartridge chamber, a DX contact switch 6, a perforation edge sensor 7 for detecting perforations of the film while it is being transported, main switch 8, and shutter release switch 9. The CPU 1 receives signals from the cartridge chamber lid detecting switch 5, DX contact switch 6, perforation edge sensor 7, main switch 8 and shutter release switch 9, and send out control signals to the display device 2 and film-transport device 3.

Figure 4A:
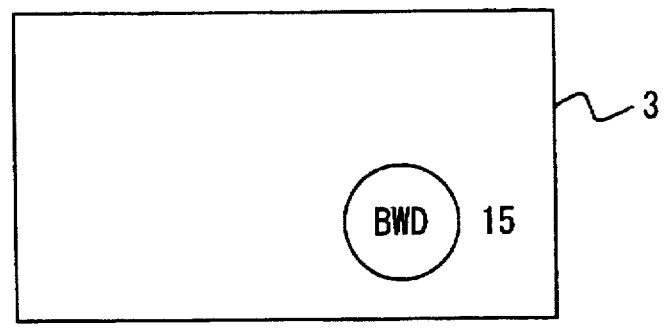
FIG. 4A is a view showing a display on a display device of the camera of FIG. 1 for informing that a backward count mode is being established.

FIG. 2A and FIG. 2B are flow charts showing a control routine executed in the camera of the present embodiment. This routine is started when the camera is loaded with a battery. In step S100 of FIG. 2A, the content of the RAM 4 is reset, i.e., values stored in the RAM 4 are set to zero. The reason for executing this step is that; although the content of the RAM 4 is eliminated when the battery is taken out of the camera, the values in the RAM 4 do not necessarily become zero when the camera is re-loaded with the battery. If it is determined in step S101 by means of the cartridge chamber lid detecting switch 5 that the lid of the cartridge chamber is open, step S102 is then executed to determine whether the camera is being loaded with the film or not by detecting DX contact signals from the DX contact switch 6. If it is determined in step S102 that the camera is loaded with the film, step S103 is then executed to determine whether the lid of the cartridge chamber is closed or not through the cartridge chamber lid detecting switch 5. If it is determined in step S102 that the camera is not loaded with the film, step S102 is repeated. If it is determined in step S103 that the lid of the cartridge chamber is closed, step S104 is then executed to set a display of the display device 2 to a backward count display mode (which will be described later). If it is determined that the lid of the cartridge chamber is not closed, step S103 is repeated. In step S105, the number of frames of the film, which frames are available for photographing, is read based on the signals received from the DX contact switch 6. In step S106, the number of frames of the film which has been read in step S105 is written in the RAM 4. In step S107, the film-transport device 3 transports the film so that the first frame is located at a position that allows the frame to be exposed upon photographing. In step S108, the display device 2 displays a backward count display mark as shown in FIG. 4A.

Figure 3:
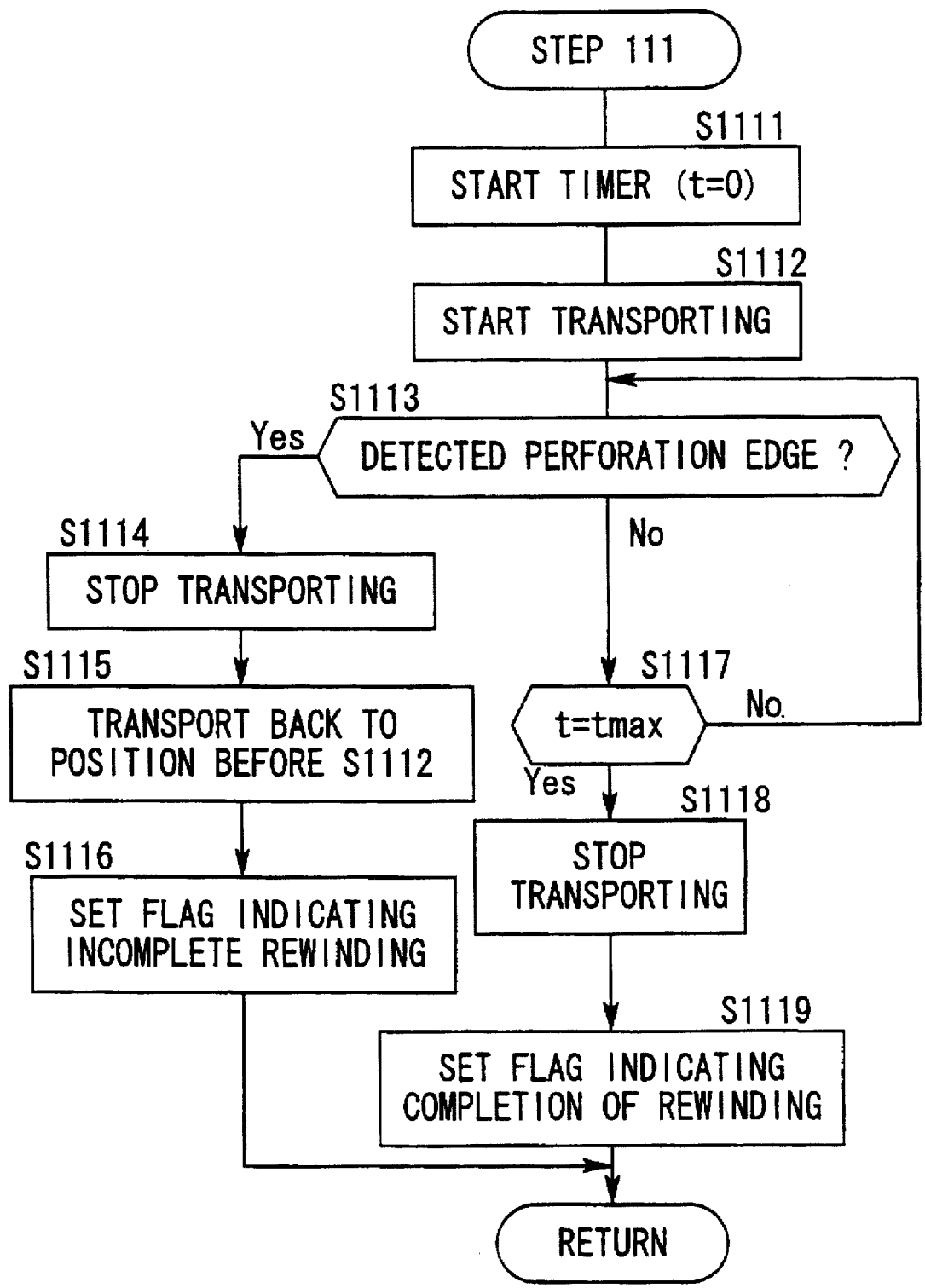
FIG. 3 is a flow chart showing in detail a part of the control routine of FIG. 2A.

If a negative decision is obtained in step S101, that is, if it is determined that the lid of the cartridge chamber is not open, step S109 is then executed to determine whether or not the RAM 4 is reset and stored information is eliminated. If it is determined that the RAM 4 is reset, step S110 is then executed to determine through the DX contact switch 6 whether the camera is being loaded with the film or not. If it is determined in step S109 that the RAM 4 is not reset, the control flow goes to step S115. If it is determined in step S110 that the camera is being loaded with the film, the control flow goes to step S111 in which a rewinding detection subroutine as shown in detail in FIG. 3 is executed. If it is determined in step S110 that the camera is not being loaded with the film, the control flow goes to step S114. The above step S111 is followed by step S111A to determine whether rewinding of the film has been completed based on a flag that is set in step S111. If it is determined in step S111A that rewinding of the film has been completed, the control flow goes to step S114. If it is determined that rewinding of the film has not been completed, step S112 is then executed to set the display of the display device 2 to a forward count display mode (which will be described later). In step S113, the number of frames stored in the RAM 4 is set to "1", and the control flow goes to step S115. In step S114, the number of frames in the RAM 4 is not set to "1", and a mark "E" representing an error is displayed on the display device 2 instead.

Figure 4B:
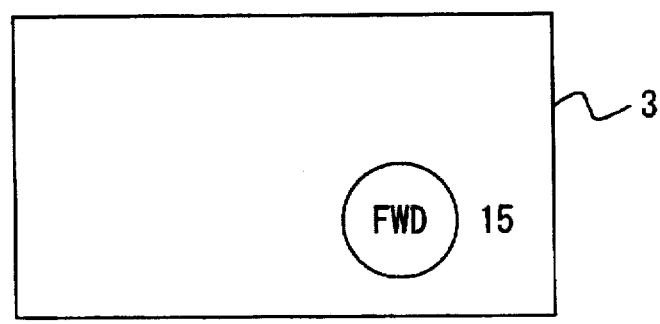
FIG. 4B is a view showing a display on the display device of the camera of FIG. 1 for informing that a forward count mode is being established.

In step S115 of FIG. 2B, the number of frames retrieved from the RAM 4 is displayed. Where the backward count mode is selected as the display mode of the display device 2, a display as shown in FIG. 4A is provided. Where the forward count mode is selected, on the other hand, a display as shown in FIG. 4B is provided. If it is determined in step S116 that the main switch 8 is ON, step S117 is then executed to determine whether the shutter release switch 9 is ON. If it is determined in step S116 that the main switch 8 is OFF, the control flow returns to step S101. If it is determined in step S117 that the shutter release switch 9 is ON, step S108 is then executed to take a picture. In step S119, the film is transported to the next frame by the film-transport device 3. If it is determined in step S120 that the frame to which the film is transported in step S119 is the last frame, the control flow goes to step S124. If the frame is not determined to be the last frame, step S121 is executed to determine whether the backward count mode is selected as the display mode of the display device 2. If it is determined in step S121 that the backward count mode is selected, the control flow goes to step S123. If it is determined that the forward count mode is selected, the control flow goes to step S122 in which 1 is added to the number of the frames stored in the RAM 4 to update the frame number. The thus updated frame number is then written in the RAM 4, and the control flow returns to step S101. In step S123, 1 is subtracted from the number of frames stored in the RAM 4 to provide the updated number of unexposed frames, which is then written in the RAM 4, and the control flow returns to step S101. In step S124, the film is rewound by the film-transport device 3. In step S125, the RAM 4 is reset.

FIG. 3 is a flow chart showing in detail the above-described step S111 for determined whether the film has been rewound or not.

In step S1111, a timer "t" is set at 0 (t=0) to start measurement of time. In step S1112, transporting, i.e., rewinding in this step, of the film is started by the film-transport device 3. If it is determined in step S1113 that any perforation edge of the film is detected by the perforation edge sensor 7, step S1114 is then executed to stop transporting the film. In step S1115, the film is transported back to the point where the rewinding is started in step S1112, and a flag representing incomplete rewinding is set in step S1116. If it is determined in step S1113 that the perforation edge is not detected, step S1117 is then executed to determine whether the time "t" counted by the timer is equal to "tmax" (t=tmax) or not. If it is determined that "t" is equal to "tmax", step S1118 is executed to stop transporting the film. If it is determined in step S1117 that "t" is smaller than "tmax" (t <tmax), the control flow goes back to step S1113. Step S1118 is followed by step S1119 to set a flag that indicates that rewinding of the film has been completed.

In the camera of the present invention, whether the battery has been replaced or not is determined by determining whether the RAM 4 is reset or not (in step S109). When a new film is mounted in the camera, the backward count mode is established for the display device 2 (in step S104). When the replacement of the battery is detected, on the other hand, the display device 2 is set to the forward count display mode in which the content of the RAM 4 is set to "1" (step S113), and "1" is displayed on the display device 2 (in step S115) immediately after the battery is replaced. Thereafter, the displayed number is incremented each time a picture is taken (step S121, step S122 ) in the forward count display mode. The display device 2 also provides an indication (e.g., mark) that indicates the currently selected one of the backward count mode and forward count mode. Thus, when the battery is replaced, the display of the display device 2 for the film counter is switched to the forward count mode in which the displayed number is incremented each time a picture is taken, and the indication is also provided for informing the user that the forward count mode is currently selected. This eliminates the possibility that the user recognizes by mistake the displayed number as the actual number of remaining frames after replacement of the battery.

Figure 4C:
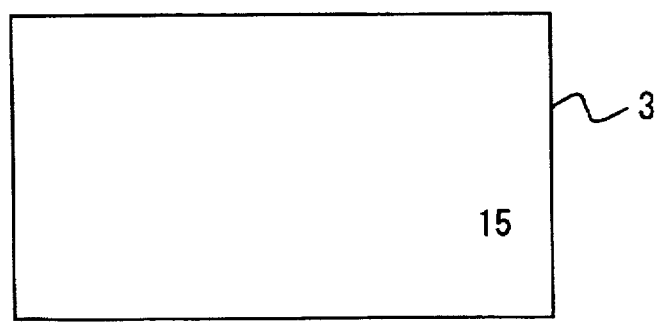
FIG. 4C is a view showing a display on a display device of a camera of a modified example in which no indication of a selected count mode is provided.

In the illustrated embodiment, the marks indicating the backward count mode and forward count mode are displayed on the display device 2 as shown in FIG. 4A and FIG. 4B, respectively. It is however possible to display a mark representing only one of the backward and forward count modes on the display device 2, to discriminate one of these modes from the other so as not to give an erroneous assumption to the user. Further, only the number related to the frames may be displayed as shown in FIG. 4C in both of the forward count and backward count display modes, without discriminating one of these modes from the other by means of the mark(s) or other indication. Even in this case, the user is supposed to perceive that the displayed number is incremented for each exposure after the display device 2 is switched to the forward count mode, and is therefore able to recognize that the backward count mode is not selected, i.e., that the displayed number does not represent the number of remaining unexposed frames.

While the determination as to whether the film is newly mounted in the camera or not is made by detecting the DX contact signals in the camera of the present embodiment, the same determination may be made by detecting mounting of the film cartridge by means of a mechanical switch.

While the occurrence of replacement of the battery is determined by determining whether the RAM 4 storing the number of remaining unexposed frames of the film is reset or not in the illustrated embodiment, this determination is not necessarily made by using the RAM 4 storing the remaining frame number of the film. For example, a part of the RAM may serve as a flag exclusively used for determining whether the battery has been replaced or not. In operation, the content of the exclusive flag is reset to a predetermined value in the initial routine executed after the battery is replaced, and whether the battery has been replaced or not can be determined by looking at the content of this flag.

What is claimed is:

1. A camera having a film counter in which a number of remaining unexposed frames of a film is displayed, comprising:

a display device which displays information related to frames of a film;

a detector which detects that a battery has been replaced while the camera is loaded with the film;

a volatile memory which stores information related to the number of remaining unexposed frames of the film; and a controller which causes said display device to display the number of remaining unexposed frames according to said information stored in said volatile memory until the battery is replaced, and switches said display device to display a frame number in a forward count display in response to a signal generated by said detector upon replacement of the battery, said forward count being a count in which said frame number increases for each exposure.

2. A camera having a film counter according to claim 1, wherein said detector determines that the battery has been replaced by detecting that a content of said volatile memory is being set with a predetermined content.

3. A camera having a film counter according to claim 1, wherein said display device provides an display that discriminates between a display of said number of remaining unexposed frames of the film and a display of said frame number in said forward count display.

4. A camera having a film counter according to claim 1, further comprising a battery replacement information memory which stores information related to replacement of said battery, wherein said detector determines that said battery has been replaced by detecting that a content of said battery replacement information memory is being set with a predetermined content.

5. A camera having a film counter according to claim 2, further comprising an initializing section which initially sets said volatile memory with said predetermined content when the camera is loaded with said battery.

6. A camera having a film counter according to claim 4, further comprising an initializing section which initially sets said volatile memory with said predetermined content when the camera is loaded with said battery.

7. A camera having a film counter, which is driven by a battery and in which a number of remaining unexposed frames of a film is displayed, comprising:

a volatile memory which stores a number of frames of the film;

a count mode setting section where one of a backward count mode in which said number of frames in said volatile memory is decremented for each exposure and a forward count mode in which said number of frames is incremented for each exposure is selectively set;

a display device which displays information related to said number of frames of the film;

a cartridge load detector which detects that a film cartridge is newly loaded into the camera;

a cartridge presence detector which detects that the film cartridge is present in the camera;

a rewinding state detector which detects whether said film has been completely rewound into said film cartridge;

an initializing section which initially sets said volatile memory with a predetermined content when said battery is loaded in the camera;

a film initial transport section which, when said cartridge load detector detects that said film cartridge is newly loaded into the camera, detects a number of total frames of the film cartridge, sets the number of total frames to said volatile memory, sets said count mode setting section with said backward count mode, and transports said film until a first frame of said film becomes ready for photographing, a battery replacement detecting section which, when said volatile memory is set with said predetermined content and said cartridge presence detector detects that said film cartridge is present in the camera and said rewinding state detector detects that said film has not been completely rewound, detects that said battery has been replaced while said film cartridge is present in the camera, sets said number of frames to said volatile memory, and sets said count mode setting section with said forward count mode; and a controller which increments said number of frames in said volatile memory for each exposure in said forward count mode, decrements said number of frames in said volatile memory for each exposure in said backward count mode, controls said display device to display said number of frames in said volatile memory and display an indication discriminating between said forward count mode and said backward count mode based on a content of said count mode setting section.

* * * * *